United States Patent [19]

Bergmann

[11] Patent Number: 5,140,655
[45] Date of Patent: Aug. 18, 1992

[54] OPTICAL STAR COUPLER UTILIZING FIBER AMPLIFIER TECHNOLOGY

[75] Inventor: Ernest E. Bergmann, Fountain Hill, Pa.

[73] Assignee: AT&T Bell Laboratories, Murray Hill, N.J.

[21] Appl. No.: 742,267

[22] Filed: Aug. 7, 1991

Related U.S. Application Data

[63] Continuation-in-part of Ser. No. 577,343, Sep. 4, 1990, abandoned.

[51] Int. Cl.$^5$ .................................. G02B 6/28
[52] U.S. Cl. ........................................ 385/46; 385/42; 385/43; 385/44; 385/47
[58] Field of Search ................. 385/46, 47, 42, 43, 385/44, 45, 39

[56] References Cited

U.S. PATENT DOCUMENTS

| 4,834,481 | 5/1989 | Lawson et al. | 350/96.16 |
| 4,941,726 | 7/1990 | Russell et al. | 350/96.16 |

FOREIGN PATENT DOCUMENTS 0169802  7/1986  Japan .................... 350/96.16

OTHER PUBLICATIONS

"Ten-Channel Coherent Optic Fiber . . .", R. P. Braun et al. *ECOC*, pp. 29-32. Jan. 1986.
"Recent Progress in Multichannel Coherent Lightwave . . .", W. B. Sessa et al. *SPIE*, vol. 1175, pp. 241-248, Jan. 1989.
"Densely spaced FDM Coherent . . .", B. Glance et al. *Elec. Lett.*, vol. 25, No. 10, May 1989.
"16-Channel Optical FDM Distribution . . .", H. Toba et al. *Elec. Lett.*, vol. 25, No. 14, Jul. 1989.
"Performance of Erbium-Doped Fibre Amplifier . . .", R. Welter et al. *Elect. Lett.*, vol. 25, No. 20, Sep. 1989.
"7203-User WDM Broadcast Network . . .", A. M. Hill et al. *Elec. Lett.*, vol. 26, No. 9, Apr. 1990.

*Primary Examiner*—Georgia Y. Epps
*Attorney, Agent, or Firm*—Wendy W. Koba

[57] ABSTRACT

An M×N optical star coupler is disclosed which utilizes fiber amplifier technology to provide amplification of message signals. The input signals to the star comprise at least one message signal and at least one pump signal. The message signals and pump signals combine in an amplifier coupling region to form as an output the amplified message signals. The amplified message signals are then coupled into the plurality of N output waveguides. In one embodiment, a plurality of fiber amplifiers are coupled in a one-to-one relationship to the plurality of output waveguides. Since the amplifier is reciprocal in nature, the star may be utilized as a bidirectional device. The couplers may also be connected together to form a cascaded arrangement capable of providing re-amplification of the message signals.

28 Claims, 5 Drawing Sheets

OPTICAL STAR COUPLER UTILIZING FIBER AMPLIFIER TECHNOLOGY

This application is a continuation-in-part of application Ser. No. 07/577,343, filed on Sep. 4, 1990, now abandoned.

BACKGROUND OF THE INVENTION

1. Field of the Invention

The present invention relates to an optical star coupler and, more particularly, to an M×N amplified star coupler.

2. Description of the Prior Art

Rare earth-doped fiber amplifiers are beginning to find a wide variety of uses in optical communication systems. In particular, such amplifiers have been suggested for use in multichannel distribution networks. An article entitled "16-Channel Optical FDM Distribution/Transmission Experiment Utilizing $Er^{3+}$-Doped Fibre Amplifier", by H. Toba et al. appearing in *Electronics Letters*, Vol. 25, No. 14, July 1989, discusses one such broadcast arrangement. In particular, Toba et al. describe a system where sixteen DFB lasers, operating at 5 GHz frequency intervals, are applied as inputs to a 16×16 star coupler. The multiplexed signals at each output port are then combined with a pump laser operating at 1.48 μm and applied as an input to an isolated $Er^{3+}$-doped fiber amplifier. The amplified signals are then transmitted over single mode fiber to the predefined destination. The arrangement as described utilizes a discrete fiber amplifier arrangement (i.e., pump source, couplers, doped fiber) for each of the sixteen output fibers. For large systems, the number of additional components required to provide amplification may become cost and size prohibitive.

An alternative arrangement is disclosed in an article entitled "7203-User WDM Broadcast Network Employing One Erbium-Doped Fibre Power Amplifier", by A. M. Hill et al. appearing in *Electronic Letters*, Vol. 26, No. 9, April 1990 at pp. 605-7. The network in this case uses a series of ten DFB lasers to transmit 320 digitized video channels. The channels are multiplexed at a remote location using a number of separate 2×2 couplers to form a relatively large number of separate multiplexed signals. At an intermediate location, a particular multiplexed signal passes through an isolated erbium-doped fiber amplifier and subsequently through five stages of various passive couplers (including 1×7 and 3×3 fused fiber couplers) to provide signals to the 7203 users. The use of the multiply-cascaded couplers in this arrangement, however, is reported to introduce a loss of approximately 40 dB into the system. For most applications such a loss in unacceptable.

Thus, a need remains in the art for a viable communication alternative which exploits the benefits of fiber amplifiers, without incurring the limitations as discussed above.

SUMMARY OF THE INVENTION

The need remaining in the prior art is addressed by the present invention which relates to a fiber optic star coupler and, more particularly, to an M×N amplified star coupler.

In accordance with one embodiment of the present invention, a star coupler is formed which includes a plurality of M input optical waveguides and a plurality of N output optical waveguides (where M may be equal to N and the waveguides may comprise optical fibers, thin-film waveguides, or any other suitable medium capable of providing optical transmission). A plurality of L message signals ($1 \leq L < M$) are applied as inputs to L of the M input waveguides. At least one of the remaining M−L input waveguides is coupled to a laser pump source. Disposed between the input and output waveguides is an amplifier coupling region capable of directly mixing the message signals with the pump signals to provide amplification of the input message signals. The amplifier coupling region may comprise a fiber amplifier, a thin-film optical amplifier, or any other arrangement suitable of providing optical amplification. The amplified message signals are subsequently coupled into the plurality of N output waveguides.

In one particular arrangement utilizing an M×N star coupler and a single pump laser, a plurality of M−1 separate message signals may be amplified and transmitted over the N output waveguides. An alternative arrangement particularly suited for use with a relatively large star may include only one or two message signals and a large plurality (M−1 or M−2, for example) of pump sources. The amount of optical gain is known to be directly proportional to the available pump power at the amplifier. Therefore, increasing the number of pump sources will result in increasing the pump power within the amplifier coupling region.

A bidirectional M×N amplified star of the present invention may be formed to include a first plurality of L message signals and M−L pump sources coupled to the plurality of M "input" waveguides and a second plurality of J message signals and N−J pump sources coupled to the plurality of N "output" waveguides. Since such amplifiers are known to be reciprocal devices, the quantity N−J may be zero, with the second plurality of J message signals being amplified by the M−L pump sources located at the "input" to the star.

In an alternative embodiment of the present invention, wavelength selective elements, such as filters or demultiplexers, may be included to essentially prevent the unwanted pump signal from propagating along the output signal paths.

The amplifier coupling region of the present invention, in one embodiment, may comprise a signal combiner for collecting the various message and pump signals, with an amplifying section attached to the combiner output. The simultaneous presence of the pump and message signals within the amplifier section will provide as an output of the coupling region a plurality of amplified message signals which may then be coupled into the plurality of output waveguides. The amplifying section may comprise a section of fiber amplifier. Alternatively, the amplifier coupling region of the present invention may utilize a plurality of separate amplifying sections coupled in a one-to-one relationship with the plurality of output waveguides. Various other embodiments are possible, as long as the inputs to the optical star coupler comprise both message and pump signals, with amplification means disposed between the input and output waveguides.

An advantage of the present invention is that the location of the pump source with respect to the amplifier coupling region is not critical. That is, the pump may be located either downstream or upstream of the message signal, as long as both the pump and message signal simultaneously pass through the amplifier coupling region. Therefore, a bidirectional M×N star may be formed and used to transmit information in the opposite direction (i.e., from one of the N receivers through the amplifying region and into the M message sources). Another advantage of the present invention is the relative ease with which the coupler may be reconfigured to delete or insert additional amplifier components as the coupler requirements are changed as a function of time.

Further, a plurality of the amplified couplers may be connected so as to form a cascaded network capable of providing subsequent re-amplification of the transmitted message signals.

Other and further advantages of the present invention will become apparent during the course of the following discussion and by reference to the following drawings.

BRIEF DESCRIPTION OF THE DRAWING

Referring now to the drawings, where like numerals represent like parts in several views.

DETAILED DESCRIPTION

Figure 1:
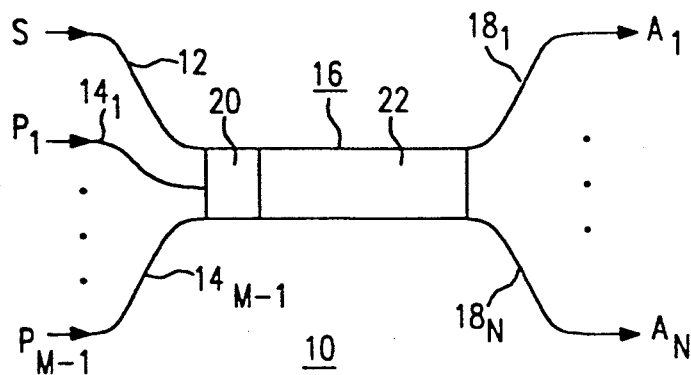
FIG. 1 illustrates an exemplary M×N amplified star of the present invention which includes a single message source S and a plurality of M−1 pump sources, utilizing a single fiber amplifier coupling region.

FIG. 1 illustrates an exemplary M×N amplified star 10 of the present invention particularly suited for applications where it is desired to transmit a single message signal S to a large number of destinations. Amplified star 10 includes an input fiber 12 which is coupled to a signal source (not shown) such that a first message signal S enters star 10. It is to be understood that the various input and output optical signal paths, and amplifying regions, depicted in the following embodiments are shown as comprising optical fibers for illustrated purposes only. As mentioned above, these various components may comprise, in the alternative, thin-film optical waveguides or any other suitable optical communication medium. In particular, with respect to the amplifier coupling region, one embodiment may comprise the utilization of an external light source which illuminates a region where both the message and pump signals exist (referred to in the art as "side-pumped" amplification).

Returning to the description of FIG. 1, the remaining M−1 input fibers $14_1$-$14_{M-1}$ are coupled to a plurality of pump sources (not shown) so as to receive a plurality of M−1 pump signals, denoted $P_1$-$P_{M-1}$ in FIG. 1. In general, only one such pump source is required, with the remaining inputs either connected to additional pump sources (to supply the required power), or left unconnected. As illustrated, amplified star 10 comprises a fused fiber coupler where input fibers 12, $14_1$-$14_{M-1}$ are joined in a coupling region 16 to a plurality of N output fibers $18_1$-$18_N$. In accordance with this particular embodiment of the present invention, coupling region 16 comprises a signal combiner 20 and a fiber amplifier 22. As shown, the plurality of M input fibers 12,$14_1$-$14_{M-1}$ are attached to combiner 20 so as to provide the coexistence of message signal S and the plurality of pump signals $P_1$-$P_{M-1}$ within combiner 20. The combined signals subsequently enter fiber amplifier 22 where message signal S is amplified and coupled into the plurality of output fibers $18_1$-$18_N$. The plurality of N amplified message signals $A_1$-$A_N$ are illustrated in FIG. 1. The doping of fiber amplifier 22 and wavelength of the associated pump signals $P_1$-$P_{M-1}$ are chosen to provide the desired amplification of message signal S. For example, the combination of an erbium-doped fiber amplifier and pump sources having a wavelength of approximately 1.47 $\mu$m-1.49 $\mu$m has been found to provide sufficient amplification of message signals at a wavelength within the range of, for example, 1.54 $\mu$m-1.56 $\mu$m. Other material dopants, such as $Nd^{3+}$, $Ho^{3+}$, $Cr^{3+}$ (ruby) may also be used, in association with the appropriate pump and signal wavelengths for each medium and dopant.

Figure 2:
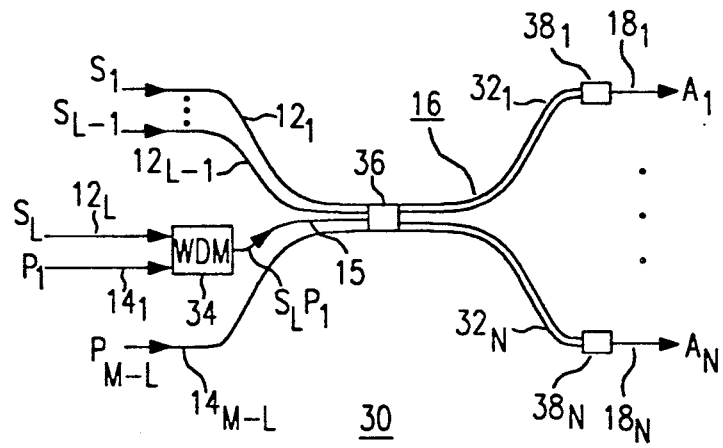
FIG. 2 illustrates an alternative M×N amplified star including a plurality of L message sources and a plurality of M−L pump sources, utilizing a plurality of N fiber amplifiers to form the coupling region between the input fibers and the output fibers.

An alternative M×N amplified star 30 of the present invention is illustrated in FIG. 2. In this arrangement, a plurality of L (L<M) message signals $S_1$-$S_L$ are applied as inputs to a plurality of fibers $12_1$-$12_L$. The remaining M−L input fibers $14_1$-$14_{M-L}$ are coupled to receive pump signals $P_1$-$P_{M-L}$, respectively. As shown in FIG. 2, message signal $S_L$ and pump signal $P_1$ are applied as inputs to a wavelength division multiplexer 34. Multiplexer 34 subsequently provides as an output a combination $S_LP_1$ which propagates along a single input fiber, denoted 15. Although exemplary in nature, such wavelength division multiplexing may be utilized at various inputs associated with this or any other embodiment of the present invention. As with amplified star 10 of FIG. 1, input fibers $12_1$-$12_{L-1}$, 15, and $14_2$-$14_{M-L}$ of star 30 are coupled through fiber amplifier coupling region 16 to output fibers $18_1$-$18_N$. In this example, fiber amplifier coupling region 16 comprises a plurality of N sections of fiber amplifier $32_1$-$32_N$, coupled in a one-to-one relationship with the plurality of N output fibers $18_1$-$18_N$. Fiber amplifiers $32_1$-$32_N$ are coupled to both message signal input fibers $12_1$-$12_L$ and pump signal input fibers $14_1$-$14_{M-L}$, as shown in FIG. 2, to form a combining region 36 (similar in form and function to signal combiner 20 of FIG. 1) wherein message signals $S_1$-$S_L$ and pump signals $P_1$-$P_{M-L}$ will coexist. The combined signals will therefore be amplified as they pass through each fiber amplifier $32_i$ associated with each output fiber $18_i$. A plurality of wavelength dependent elements $38_1$-$38_N$ may be disposed between fiber amplifiers $32_1$-$32_N$ and fibers $18_1$-$18_N$ to essentially remove the pump signals from propagating along the output fibers. Elements $38_1$-$38_N$ may comprise wavelength selective filters, demultiplexers, or other similar devices capable of blocking (or introducing) the propagation of the predetermined pump wavelength.

Figure 3:
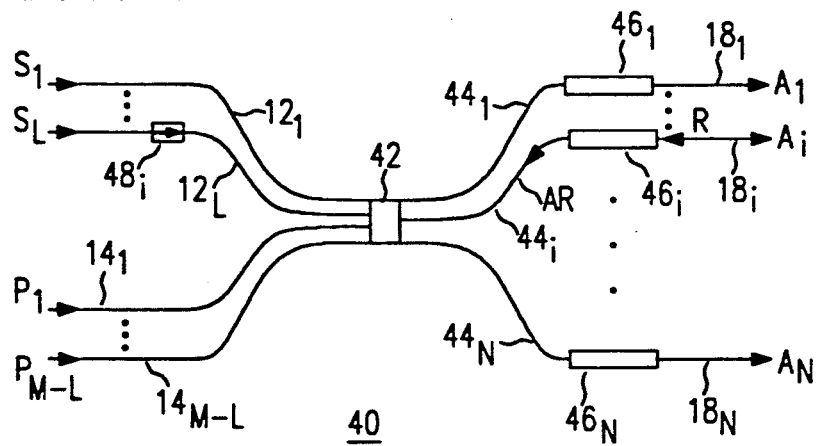
FIG. 3 illustrates yet another embodiment of the present invention, particularly illustrating the use of a plurality of separate fiber amplifiers associated with each output fiber, as well as the ability to provide bidirectional communication through the amplified star of the present invention.

As a result of the reciprocal nature of fiber amplification, the M×N amplified star of the present invention may be utilized as a bidirectional device. An exemplary bidirectional M×N amplified star 40 is illustrated in FIG. 3. Similar to star 30 of FIG. 2, a plurality of L message signals $S_1$-$S_L$ and a plurality of M−L pump signals $P_1$-$P_{M-L}$ are applied as inputs to fibers $12_1$-$12_L$ and $14_1$-$14_{M-L}$, respectively, of amplified star 40. These signals subsequently mix together within a combining region 42 and subsequently propagate along a plurality of interconnecting fibers $44_1$-$44_N$ to a plurality of fiber amplifiers $46_1$-$46_N$, as shown in FIG. 3. The amplified output signals, denoted $A_1$-$A_N$, from the plurality of fiber amplifiers are then coupled into the plurality of output fibers $18_1$-$18_N$. As shown in FIG. 3, a return communication signal R is coupled to an exemplary output fiber $18_i$ so as to propagate in the opposite direction through fiber amplifier $46_i$. It is to be noted that a single return signal is illustrated in FIG. 3 for the sake of clarity. In general, a plurality of J (J≦N) such signals may be transmitted. As with the forward-directed signals, return signal R and pump signals $P_1$-$P_{M-L}$ must co-exist in fiber amplifier $46_i$ to provide the desired amplification of return signal R. The direction of travel of the signals is not material to the operation of such fiber amplifiers. Referring to FIG. 3, amplified return signal AR will exit fiber amplifier $46_i$ and be coupled via combining region 42 into input fibers $12_1$-$12_L$, $14_1$-$14_{M-L}$. In some cases, a plurality of K input fibers may be prevented from receiving the return message signal by including an isolator $48_i$ in each of the K input fibers.

Figure 4:
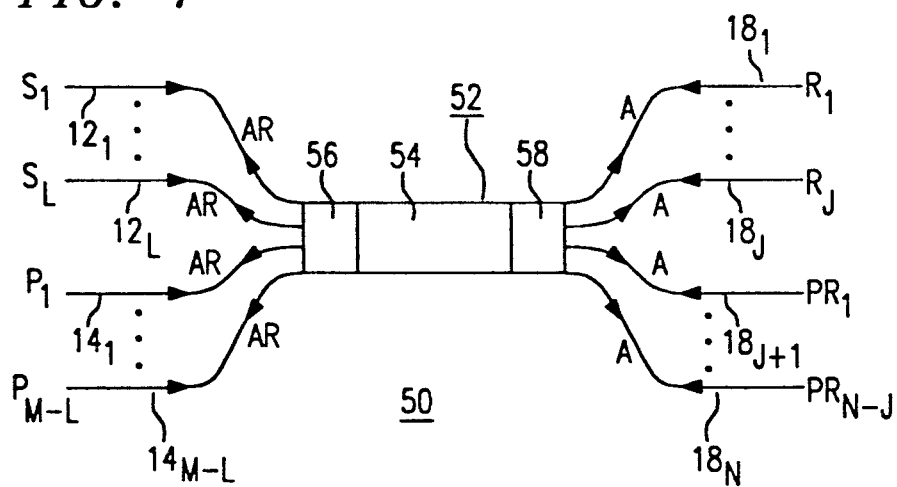
FIG. 4 illustrates an alternative bidirectional amplified star of the present invention, with signal and pump sources located at both the input and output of the star arrangement.

In general, a bidirectional amplified star of the present invention may be formed to include pluralities of message and pump sources on each side of the star. One exemplary bidirectional amplified star 50 is illustrated in FIG. 4. Amplified star 50, shown as an M×N star, utilizes as inputs a first plurality of L message signals $S_1$-$S_L$, a first plurality of M−L pump sources $P_1$-$P_{M-L}$ (where these signals are coupled to fibers $12_1$-$12_L$ and $14_1$-$14_{M-L}$, respectively), a second plurality of J message signals $R_1$-$R_J$ and a second plurality of N−J pump sources $PR_1$-$PR_{N-J}$ (where these signals are coupled to fibers $18_1$-$18_J$, $18_{J+1}$-$18_N$, respectively). Similar to the arrangement of FIG. 1, the amplification of the message signals occurs in a fiber amplifier coupling region 52 disposed between the fiber groups. In this particular embodiment, coupling region 52 comprises a fiber amplifier 54 disposed between a first signal combiner 56 and a second signal combiner 58. In operation, first signal combiner 56 mixes together the first pluralities of the message signals $S_1$-$S_L$ and pump sources $P_1$-$P_{M-L}$ before they enter fiber amplifier 54. As discussed above, the message signals, in the presence of the pumps, will be amplified in fiber amplifier 54 and emerge as an amplified message signal A which is then coupled into the plurality of N output fibers $18_1$-$18_N$.

Similarly, second signal combiner 58 mixes together the second pluralities of message signals $R_1$-$R_J$ and pump sources $PR_1$-$PR_{N-J}$ appearing at the output fibers, coupling the combined signals into fiber amplifier 54. The amplified return signal AR subsequently passes through first signal combiner 56 and is coupled into the plurality of M input fibers. It is to be noted that it is not necessary to include a plurality of pump sources along fibers 18 output of bidirectional amplified star 50, since return signals $R_1$-$R_J$ may be configured to pass through fiber amplifier simultaneously with the first plurality of pump sources $P_1$-$P_{M-L}$, where as mentioned above, simultaneous existence of the message and pump is the only requirement to obtain amplification of the message signal.

Figure 5:
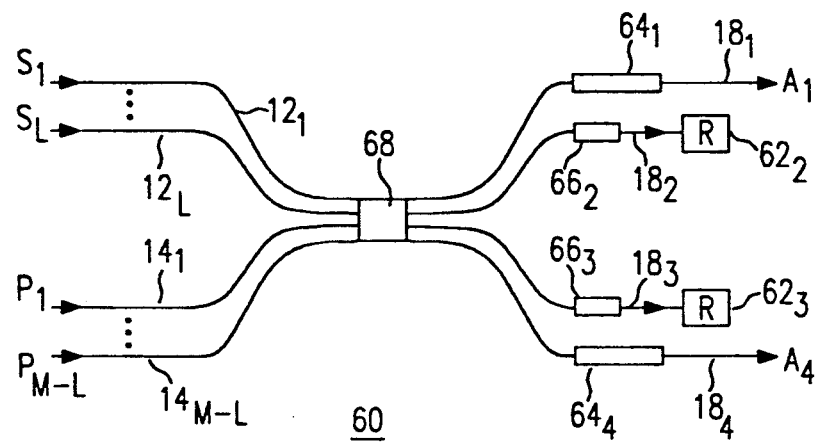
FIG. 5 illustrates an embodiment of the present invention where only selected output fibers are configured to include fiber amplifiers.

In some applications, it may not be necessary to provide amplification along each output fiber. For example, a number of receiving locations may be located sufficiently close to the star coupler such that amplification of the message signals is not required. Accordingly, an amplified star 60 of the present invention, illustrated in FIG. 5, may be formed so as to include fiber amplifiers along only selected output fibers. Star 60, which is simplified to an M×4 star for illustrative purposes only, includes a pair of output fibers $18_2$, $18_3$ which require no amplification, since a pair of receiving devices $62_2$, $62_3$ are located in relative close proximity to coupler 60. The remaining pair of output fibers $18_1$, $18_4$ are illustrated as including a pair of fiber amplifiers $64_1$, $64_4$, respectively, similar in form and function as those described above in association with FIG. 3. To prevent the unwanted transmission of the pump signals along fibers $18_2$, $18_3$, a pair of wavelength selective elements $66_2$, $66_3$, of a type previously described, may be included along their respective output fibers. It is to be understood that such an amplified star arrangement of the present invention may easily be modified during the course of its operation to either include or remove certain fiber amplifiers from the various output fibers as the requirements for the system including the inventive coupler change. Additionally, such an amplified star of the present invention may be further modified by adjusting the particular length of each fiber amplifier segment used to provide the fiber amplification. As is known in the fiber amplifier art, the amount of amplification is related to the length of the fiber segment. In general, increasing the length of the fiber segment will result in increased amplification, as long as sufficient pump signal remains. Alternatively, if it is desired to reduce the amount of amplification along a particular output path, the length of fiber amplifier may be suitably shortened.

Figure 7:
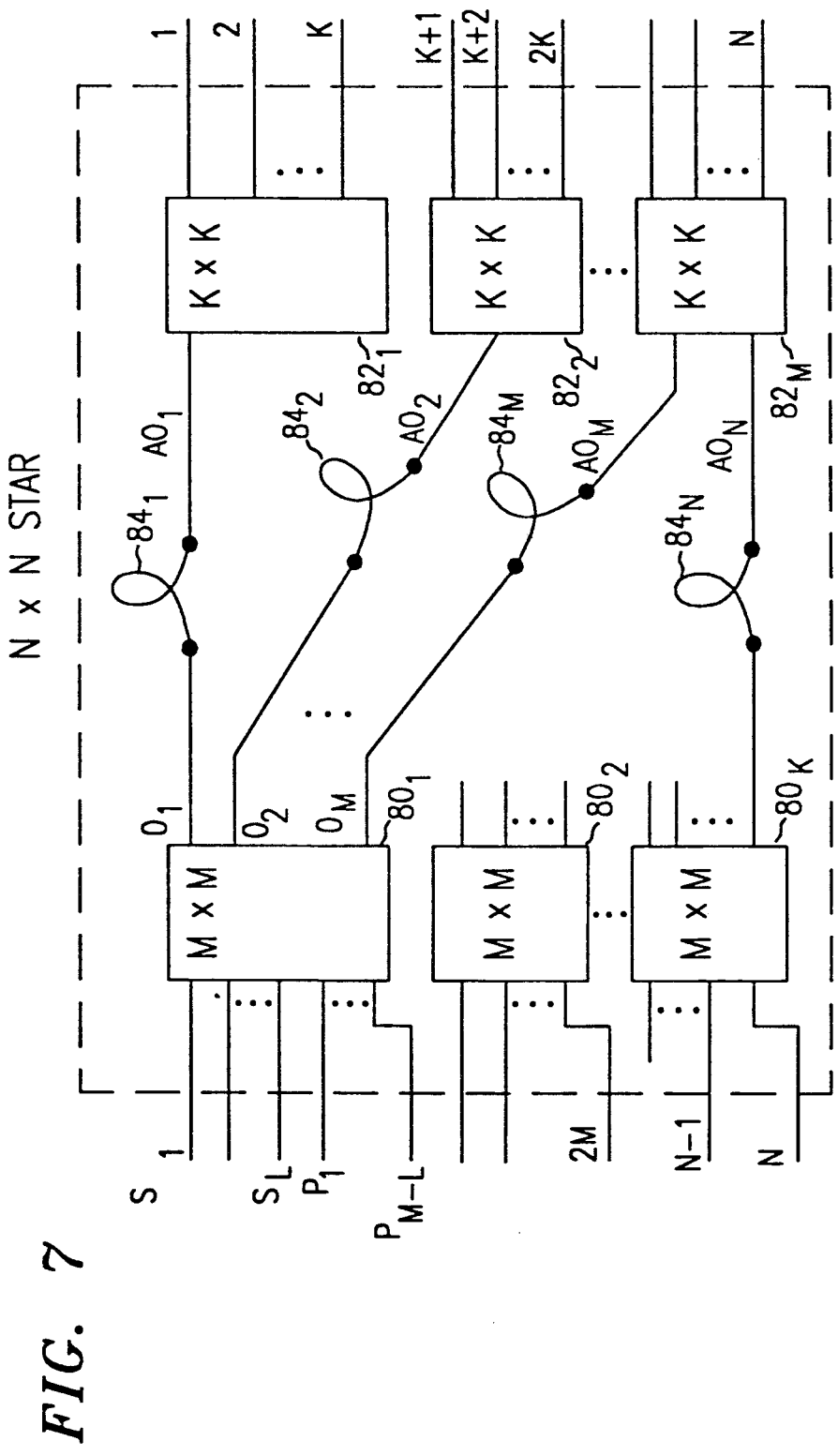
FIG. 7 illustrates another embodiment of the present invention for forming a relatively large amplified N×N star, utilizing in particular a plurality of K M×M input couplers and a plurality of M K×K output couplers, where N=KM.

An alternative arrangement for providing a relatively large N×N amplified star is illustrated in FIG. 7. As shown, the N×N configuration comprises a plurality of K input M×M couplers $80_1$-$80_K$ and a plurality of M output K×K couplers $82_1$-$82_M$, with a plurality of N fiber amplifiers $84_1$-$84_N$ disposed therebetween, where N=MK. Referring to input coupler $80_1$, a plurality of message signals $S_1$-$S_L$ and pump signals $P_1$-$P_{M-L}$ are applied as separate inputs thereto, providing as an output a plurality of combined message/pump signals $O_1$-$O_M$. Each combined output signal is then coupled to the input of a separate fiber amplifier $84_1$-$84_M$, as shown in FIG. 7. The combination of the message signals with pump signals within amplifiers $84_1$-$84_M$ results in generating a plurality of amplified output signals $AO_1$-$AO_M$, respectively. It is to be understood that each remaining input coupler $80_2$–$80_K$ may be similarly connected to a plurality of M fiber amplifiers so that in the limit a plurality of N amplified output signals $AO_1$–$AO_N$ are formed.

The complete transmission of each input message signal $S_i$ to a plurality of N subscribers is accomplished in accordance with this arrangement of the present invention by connecting the plurality of N amplified output signals $AO_1$–$AO_N$ to designated inputs of the plurality of M K×K output couplers $82_1$–$82_M$. In the particular configuration illustrated in FIG. 7, the "ith" output from each input coupler, subsequent to amplification, is applied as a separate input to the "ith" output coupler. In other words, the first amplified output $AO_1$ from input coupler $80_1$ is applied as an input to the first output coupler $82_1$. The second (amplified) output $AO_2$ from input coupler $80_1$ is applied as an input to the second output coupler $82_2$, the third output $AO_3$ is applied to third output coupler $82_3$, and so on. Similarly, the set of "first" outputs from the remaining second, third, . . . , and "Kth" input couplers $80_2$–$80_K$ are all applied as inputs to the first output coupler $82_1$; the set of "second" outputs from the remaining input couplers are connected to the second output coupler, and so on. The result of the interconnection between the plurality of K M×M input couplers, the plurality of N fiber amplifiers, and the plurality of M K×K output couplers is the transmission of a plurality of amplified message signals to a plurality of N subscribers.

In an exemplary embodiment of the arrangement of FIG. 7, a single pump input may be utilized at each input coupler. Thus, a total number of K pump lasers are being used to generate a larger number of N−K amplified message signals. In particular, each input signal appears at all N outputs, with its power divided by N, and each amplifier $84_i$ adding both gain ($G_i$) and noise power ($\sigma_i^2$). As with the arrangements of the present invention described hereinbefore, the arrangement of FIG. 7 may be extended to include additional coupler stages in order to build an even larger star.

Figure 8:
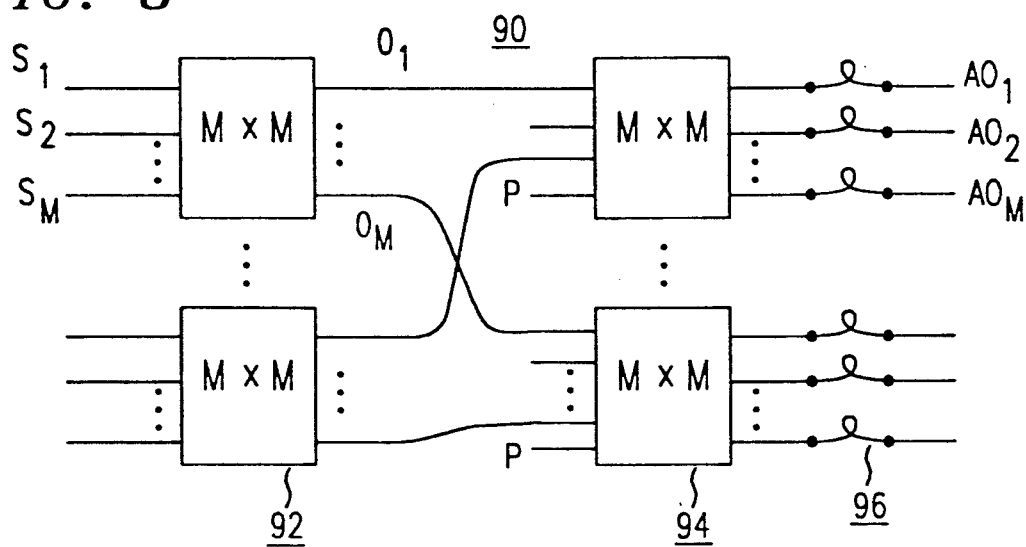
FIGS. 8-10 illustrate three separate embodiments of a two-stage M×M amplified star, showing three separate locations of the fiber amplifiers associated with the various embodiments.
Figure 9:
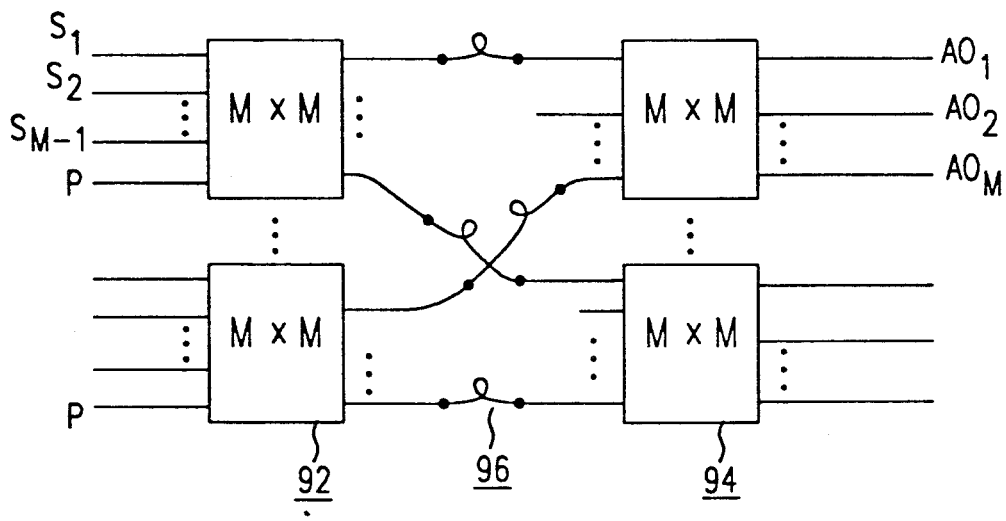
Figure 10:
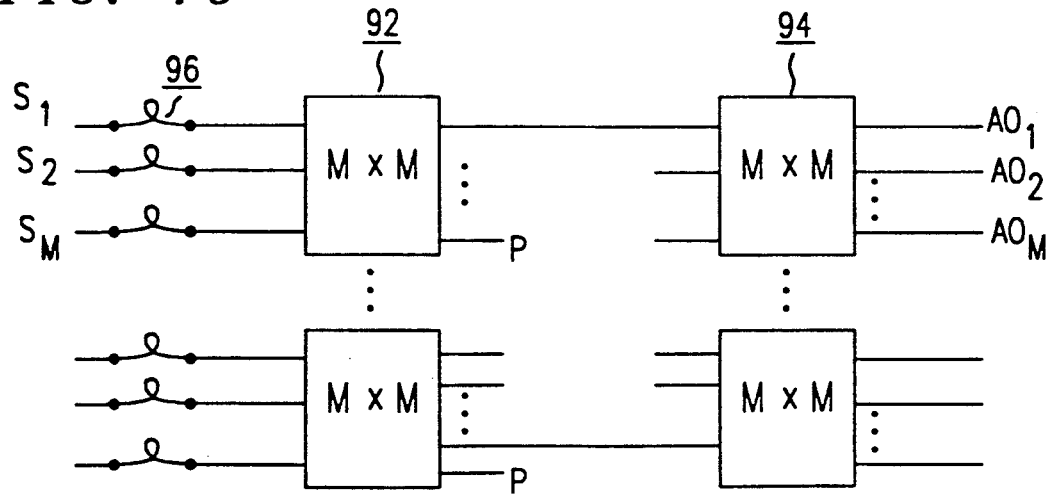

An exemplary two-stage active star of the present invention may be constructed by disposing the associated plurality of fiber amplifiers at any of three different locations, as illustrated in FIGS. 8–10. For the sake of simplicity, it will be assumed that K=M in the following discussion. Referring to FIG. 8, a two-stage active star 90 comprises a plurality of M input stage M×M couplers 92 and a plurality of M output stage M×M couplers 94, with a plurality of M fiber amplifiers 96 disposed after each stage coupler 94 (a total of $M^2$ outputs), so as to form a post-combination amplifier arrangement. An exemplary arrangement of FIG. 8 may be formed utilizing integrated star couplers, wherein each input coupler may comprise an array of channel waveguides, fabricated using silica waveguides formed on a first silicon substrate. Similarly, each output coupler may comprise an array of channel waveguides, fabricated using silica waveguides formed on a second silicon substrate. A slab waveguide may then be utilized to connect each input coupler to its associated output coupler.

FIG. 9 illustrates an arrangement where amplifiers 96 are disposed between the M input couplers 92 and the M output couplers 94, forming an inter-combination amplifier arrangement. Lastly, FIG. 10 illustrates a pre-combination amplifier arrangement where amplifiers 96 are disposed before the plurality of M input couplers 92. As will be described in detail below, the signal-to-noise ratio (SNR) for each configuration will be slightly different and should be considered for the particular application. For the sake of explanation, a selected message signal $S_i$ will be assumed to be attenuated through each coupler 92,94 by the M output ports, and also by the coupler excess loss, denoted L ($\geq 1$). An exemplary amplifier $96_i$ provides signal gain $G_i$ and introduces noise $\sigma_i^2$ (i=a, b or c for the post-, inter- or pre-combination amplifier configurations, respectively). The noise at a given coupler stage which follows the introduction of the fiber amplifiers will thus be divided among M outputs, but also multiplied by M inputs since noise is being supplied by M other amplifiers. If it is assumed that the amplifiers associated with each configuration are essentially identical (e.g., $G_a = G_b = G_c = G$; $\sigma_a^2 = \sigma_b^2 = \sigma_c^2 = \sigma^2$), then the SNR for each of the three cases can be defined as follows:

$$SNR_a = \frac{GS_1}{\sigma^2 M^2 L^2} \quad \text{(FIG. 8)}$$

$$SNR_b = \frac{GS_1}{\sigma^2 M^2 L} \quad \text{(FIG. 9)}$$

$$SNR_c = \frac{GS_1}{\sigma^2 M^2} \quad \text{(FIG. 10)}$$

With any finite excess loss (L>1), the pre-combination amplifier embodiment of FIG. 10 has the greatest SNR, since the losses in the coupler stages 92,94 attenuate both the signal and the noise, not just the signal.

If the amplifiers in the three condigurations are saturated to different degrees, it becomes important to repeat the previous analysis with the respective amplifiers having different gain and noise levels. A reasonable assumption is to equate the total output power of each fiber amplifier. Therefore, $$G_c = \frac{G_b(M-1)}{LM} = \frac{G_a(M-1)}{L^2 M}$$

Further, if it is assumed that the noise figure $NF_i$ is proportional to the quantity $\sigma_i^2/G_i$, and that the noise figure is identical for all amplifiers in a particular configuration, then $$\sigma_c^2 = \frac{\sigma_b^2(M-1)}{LM} = \frac{\sigma_a^2(M-1)}{L^2 M},$$

and the respective SNR's become $$SNR_a = \frac{G_a S_1}{\sigma_a^2 M^2 L^2} \quad \text{(FIG. 8)}$$

$$SNR_b = \frac{G_b S_1}{\sigma_b^2 M^2 L} = \frac{G_a S_1}{\sigma_a M^2 L} \quad \text{(FIG. 9)}$$

$$SNR_c = \frac{G_c S_1}{\sigma_c^2 M^2} = \frac{G_a S_1}{\sigma_a^2 M^2}. \quad \text{(FIG. 10)}$$

The relations among these SNR's are the same as in the unsaturated case, with the pre-combination amplifier configuration of FIG. 10 having the greatest SNR. However, the signal output power, denoted $S_i^{out}$, from each configuration may be defined as follows:

$$S_a^{out} = \frac{G_a S_1}{M^2 L^2} \quad \text{(FIG. 8)}$$

$$S_b^{out} = \frac{G_b S_1}{M^2 L^2} = \frac{S_a^{out}}{L} \quad \text{(FIG. 9)}$$

$$S_c^{out} = \frac{G_c S^b}{M^2 L^2} = \frac{(M-1)}{M} \frac{S_a^{out}}{L^2} \quad \text{(FIG. 10)}$$

showing that although the configuration of FIG. 8 has the poorest SNR, it does provide for the highest output signal power. Thus, the arrangement of FIG. 8 would be the preferable alternative if the system would be limited by receiver noise rather than by the amplifier noise generated in the star.

The maximum size of each coupler, denoted $M_{max}$, is ultimately determined by the available pump power launched into each fiber amplifier and the pump power necessary to achieve the desired gain. The output power of an exemplary pump laser may be denoted $P_P$, with the pump power required in the fiber amplifier to produce the desired gain with a low noise figure denoted $P_{FA}$. The value of $P_P$ will be attenuated by the splitting loss, 10 log M (dB), and by the excess losses in the various optical elements. The total excess pump losses, $L_{total}$ (dB), may typically be due to coupling losses between the pump and fiber, any filters, the star coupler, and the splice connecting the fiber amplifier to the transmission fiber. The size $M_{max}$ is therefore defined by:

$$M_{max} = 10^{(P_P - P_{FA} - L_{total})}$$

Thus, it is seen that higher pump power, lower FA gain threshold, or lower excess loss will increase the allowable size of the coupler. Further, as noted above, $M_{max}$ may be increased by connecting additional pump lasers to some of the coupler input or output ports. In spite of this sacrifice, the number of allowable signal power would actually be increased.

Figure 11:
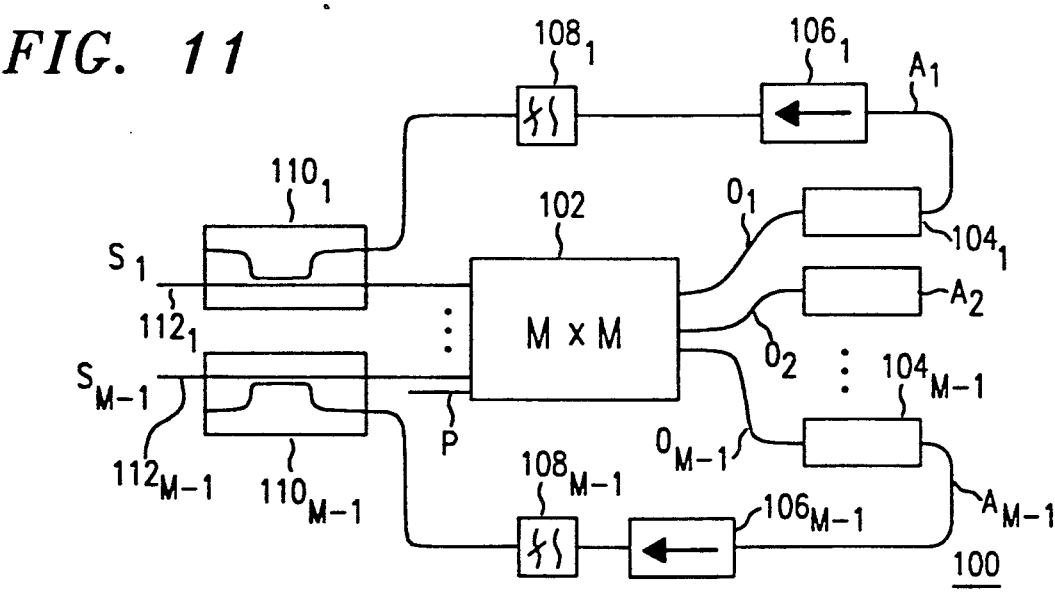
FIG. 11 illustrates yet another embodiment of the present invention wherein a single fiber is utilized to provide bidirectional communication within the star network.

FIG. 11 illustrates yet another embodiment of the present invention. A bidirectional amplified star 100 is illustrated as comprising an M×M coupler 102 which utilizes as an input a plurality of message signals $S_1$-$S_{M-1}$ and a pump signal P. It is to be understood that the number of message signals and pump signals may vary, the illustrated arrangement being exemplary only. The plurality of message signals and pump signal are combined within coupler 102 to form a plurality of M multiplexed output signals $O_1$-$O_M$. The output signals are subsequently applied as input to a plurality of M fiber amplifiers $104_1$-$104_M$ to form amplified output signals $A_1$-$A_M$. Up to this point in the description, the operation of star 100 is similar to those described above. However, the remaining portion of star 100 differs in that the plurality of amplified output signals $A_1$-$A_M$ (or a selected subset thereof) are subsequently fed back to the sources of the original input signals $S_1$-$S_{M-1}$. Referring to FIG. 11, output signal $A_1$ (which contains amplified versions of message signals $S_1$-$S_{M-1}$) subsequently passes through an isolator $106_1$ (to prevent reflections from re-entering amplified $104_1$) and a filter $108_1$ (to remove the pump signal from the amplified output signal). Coupling means $110_1$ is then utilized to launch amplified output signal $A_1$ onto the optical fiber $112_1$ associated with the source of first message signal $S_1$. Similarly, each amplified output signal may be directed back to the source of the remaining message signals $S_2$-$S_{M-1}$. Advantageously, coupling means $110_i$ are utilized such that only a single fiber is necessary to provide bidirectional communication between the plurality of sources such that amplified versions of each message signal may be distributed throughout the network.

Figure 6:
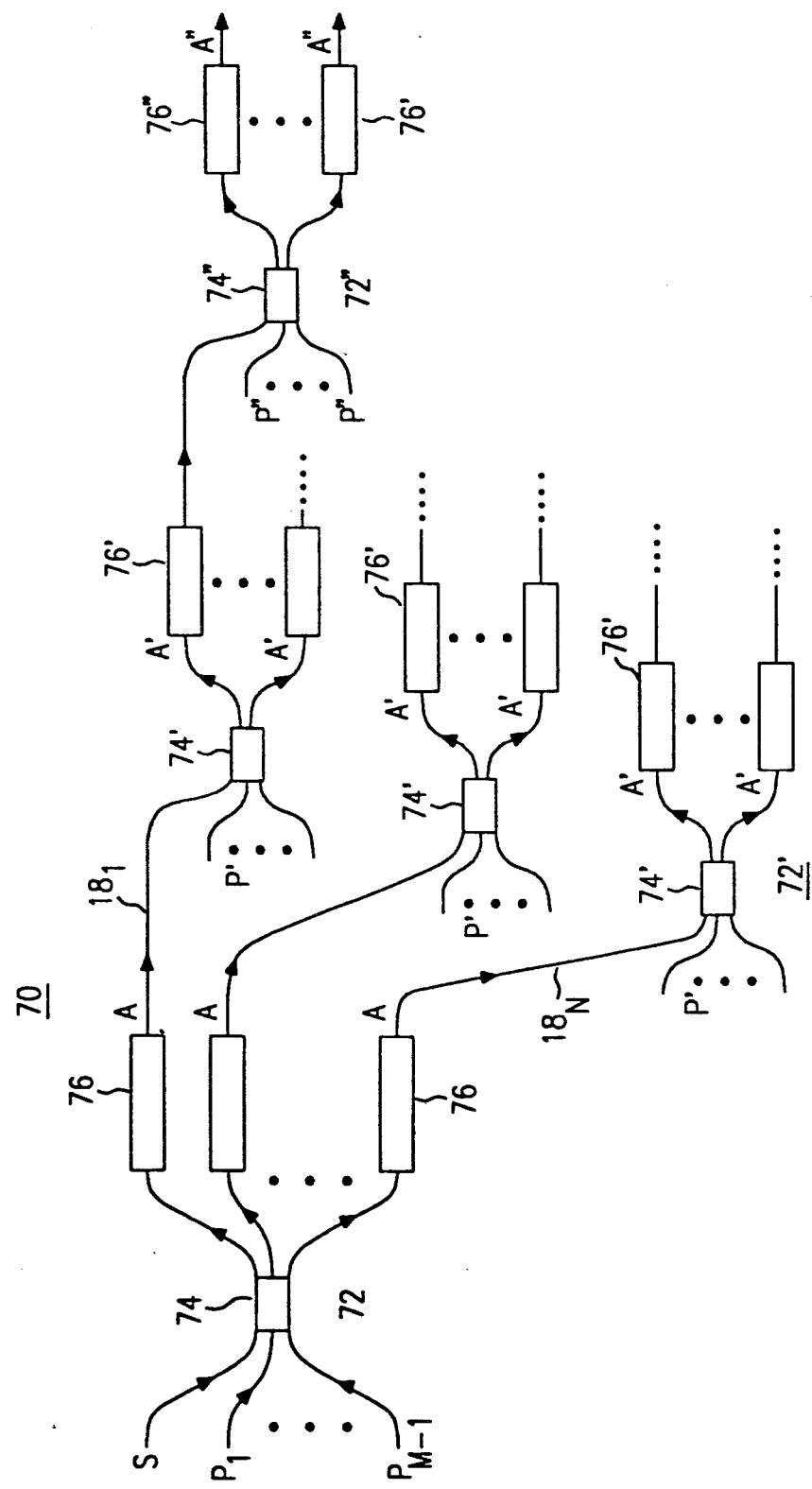
FIG. 6 illustrates an alternative arrangement utilizing a plurality of the amplified stars of the present invention configured in cascaded form for providing subsequent re-amplification of the transmitted message signal(s).

An extended star coupler amplifying arrangement 70 is illustrated in FIG. 6. The initial section 72 of arrangement 70 is similar to amplified star 40 of FIG. 3, including a signal combining region 74 and a plurality of fiber amplifiers 76. However, instead of being directly coupled to receivers, selected ones of the plurality of output fibers 18 in section 72 are applied as inputs to a second tier of fiber amplified stars 72'. Such additional amplification may be required in instances where the signal travels a significant distance (e.g., ten or more kilometers), where the exact distance depends upon many factors, including the composition of the fiber itself (i.e., glass vs. plastic fiber vs. titanium-diffused lithium niobate, etc.). The amplification process may be continued a number of times, with an exemplary third tier fiber amplified star 72" illustrated in FIG. 6. It is to be understood that such a cascaded arrangement may include the various wavelength selective elements and isolators described above in association with FIGS. 2 and 3.

I claim:

1. An optical star coupler comprising
    a plurality of M input waveguides, with L ($1 \leq L < M$) waveguides coupled to receive a plurality of L message signals and at least one of the remaining M−L waveguides coupled to receive optical pump signals;
    a plurality of N output waveguides; and
    a doped fiber amplifer coupling region disposed between the plurality of M input waveguides and the plurality of N output waveguides to provide the mixing of the message signals and the pump signals such that a plurality of N amplified message signals are generated and coupled into the plurality of N output waveguides.

2. An optical star coupler as defined in claim 1 wherein the doped fiber amplifer coupling region comprises
    a signal combiner attached to the plurality of M input waveguides for providing the optical combining of the various message and pump input signals; and
    a doped fiber amplifying section to the output of the signal combiner for providing the amplification of the plurality of L message signals.

3. An optical star coupler as defined in claim 1 wherein the doped fiber amplifier coupling region comprises
    a signal combiner attached to the plurality of M input waveguides for providing the optical combining of the various message and pump input signals; and
    a plurality of N doped fiber amplifying sections disposed between the signal combiner and the plurality of N output waveguides such that the plurality of N amplifying sections are coupled in a one-to-one relationship with said plurality of N output waveguides.

4. An optical star coupler as defined in claim 1 wherein the doped fiber amplifier coupling region comprises a signal combiner attached to the plurality of M input waveguides for providing the optical combining of the various message and pump input signals;

a plurality of N interconnecting waveguides attached to the output of said signal combiner; and at least one doped fiber amplifying section coupled between at least one interconnecting waveguide and at least one output waveguide.

5. An optical star coupler as defined in claim 4 wherein the at least one amplifying section comprises a fiber amplifier.

6. An optical star coupler as defined in claim 4 wherein the at least one doped fiber amplifying section comprises a plurality of N amplifying sections coupled in a one-to-one relationship with the plurality of N output waveguides.

7. An optical star coupler as defined in claim 1 wherein the coupler further comprises wavelength selective means disposed at the output of the doped fiber amplifier coupling region for essentially removing the pump signal from the amplified message signals.

8. An optical star coupler as defined in claim 7 wherein the wavelength selective means comprises a plurality of N wavelength selective elements disposed along each output waveguide of the plurality of N output waveguides.

9. An optical star coupler as defined in claim 1 wherein the coupler further comprises at least one wavelength division multiplexer for receiving as separate inputs a message signal and a pump signal and providing as an output to the amplifier coupling region, on a single waveguide, the combination of the message signal and the pump signal.

10. An optical star coupler as defined in claim 1 wherein the star operates as a bidirectional coupler with at least one output waveguide coupled to receive a return message signal.

11. An optical bidirectional star coupler as defined in claim 10 wherein the coupler further comprises a plurality of K optical isolators disposed along a selected plurality of K input waveguides associated with a selected plurality of K message signals, said isolators capable of essentially blocking the propagation of the return message signal.

12. An optical bidirectional star coupler as defined in claim 10 wherein the coupler comprises a plurality of J return message signals coupled to a plurality of J output waveguides and at least one return pump source coupled to at least one of the remaining N−J output waveguides.

13. An optical star coupler as defined in claim 1 wherein the optical pump signals operate at a wavelength within the range of approximately 1.47 $\mu$m–1.49 $\mu$m, and the doped fiber amplifier coupling region comprises an erbium-doped fiber amplifier.

14. An optical star coupler as defined in claim 1 wherein L=1.

15. An optical star coupler as defined in claim 1 wherein $1 \leq L \leq M$.

16. An optical star coupler as defined in claim 1 wherein at least one of the plurality of M input waveguides and the plurality of N output waveguides comprises an optical fiber.

17. An optical star coupler as defined in claim 16 wherein the plurality of M input waveguides comprises a plurality of M optical fibers and the plurality of N output waveguides comprises a plurality of N optical fibers.

18. An optical star coupler as defined in claim 1 wherein at least one of the plurality of M input waveguides and the plurality of N output waveguides comprises a thin-film optical waveguide.

19. An optical amplifying arrangement comprising a plurality of star couplers as defined in claim 1, the plurality of couplers disposed so as to form a cascaded arrangement capable of providing subsequent re-amplification of the transmitted message signals.

20. An optical star coupler as defined in claim 1 wherein the optical pump signals operate at a wavelength within the range of approximately 0.97 $\mu$m–0.99 $\mu$m.

21. An optical star coupler as defined in claim 1 wherein the plurality of M input waveguides comprise a first plurality of silica waveguides formed on a first silicon substrate; and the plurality of N output waveguides comprise a second plurality of silica waveguides formed on a second silicon substrate, wherein a slab waveguide is utilized to couple said first silicon substrate to said second silicon substrate.

22. An N×N amplified star comprising a plurality of K M×M input optical couplers, each input optical coupler responsive, at separate inputs, to a plurality of L message signals and a plurality of M−L pump signals, where N=MK;

a plurality of M K×K output optical couplers; and a plurality of N doped fiber amplifiers disposed between the plurality of K input couplers and the plurality of M output couplers, with a separate doped fiber amplifier connected between a predetermined input coupler output and output coupler input, the plurality of stars disposed such that each output from the the plurality of M K×K output optical couplers comprises each amplified input message signal.

23. An N×N amplified star as defined in claim 22 wherein M=K.

24. An N×N amplified star as defined in claim 23 wherein M−L=1, such that N−K message signals are amplified.

25. A bidirectional optical star coupler comprising a plurality of M input waveguides, with L ($1 \leq L \leq M$) waveguides coupled to receive a plurality of L message signals from a plurality of L sources and at least one of the remaining M−L waveguides coupled to receive optical pump signals;

a plurality of N output waveguides;

a doped fiber amplifier coupling region disposed between the plurality of M input waveguides and the plurality of N output waveguides to provide the mixing of the message signals and the pump signals such that a plurality of N amplified message signals are generated and coupled into the plurality of N output waveguides; and coupling means for launching selected amplified message signals of the plurality of N amplified message signals into predetermined input waveguides of the plurality of M input waveguides so as to be directed back to predetermined message signal sources.

26. A bidirectional optical star as defined in claim 25 wherein the plurality of M input waveguides and the plurality of N output waveguides comprise optical fibers.

27. A bidirectional optical star as defined in claim 25 wherein the star further comprises filtering means disposed between the doped fiber amplifier and associated coupling means for essentially removing the pump signal component of the amplified message signal.

28. A bidirectional optical star as defined in claim 27 wherein the star further comprises an optical isolator disposed between the doped fiber amplifier and associated coupling means.

* * * * *